United States Patent [19]

Iwasa et al.

[11] Patent Number: 5,459,870
[45] Date of Patent: Oct. 17, 1995

[54] INTERFACE CIRCUIT FOR CONTROLLING DATA TRANSFERS

[75] Inventors: Hiroyuki Iwasa; Masayuki Murakami; Hirofumi Saitoh, all of Fujisawa, Japan

[73] Assignee: International Business Machines Corporation, Armonk, N.Y.

[21] Appl. No.: 981,709

[22] Filed: Nov. 25, 1992

[30] Foreign Application Priority Data

Nov. 28, 1991 [JP] Japan .................. 3-337995

[51] Int. Cl.$^6$ ............................ G06F 13/14
[52] U.S. Cl. .................. 395/734; 395/853; 395/868
[58] Field of Search ................ 395/725, 275, 395/325

[56] References Cited

U.S. PATENT DOCUMENTS

| | | | |
|---|---|---|---|
| 4,069,510 | 1/1978 | Carlow et al. | 395/275 |
| 4,086,627 | 4/1978 | Bennett et al. | 395/725 |
| 4,268,906 | 5/1981 | Bourke et al. | 395/700 |
| 4,456,970 | 6/1984 | Catiller et al. | 395/275 |
| 4,847,752 | 7/1989 | Akashi | 395/425 |
| 5,038,275 | 8/1991 | Dujari | 395/275 |
| 5,150,465 | 9/1992 | Bush et al. | 395/275 |
| 5,274,795 | 12/1993 | Vachon | 395/500 |

*Primary Examiner*—Jack B. Harvey
*Assistant Examiner*—Glenn A. Auve
*Attorney, Agent, or Firm*—Steven W. Roth

[57] ABSTRACT

In a computer system including a host which operates in a pre-read mode to start a block data transfer after reading status of a peripheral device (HDD) in response to an interrupt from the peripheral device or in a post-read mode to read the status after completing the block data transfer, an interface circuit comprising mode detecting circuitry for automatically detecting whether the host operates in the pre-read mode or in the post-read mode so that data transfers can be correctly performed between the peripheral device and the host even if the host is in either mode, delay circuitry for delaying by a predetermined amount of time, a data request DRQ indicating that a block of data is ready to be transferred, when the post-read mode is detected, and interrupt circuitry for sending an interrupt request IRQ to the host in response to the output of the delay circuitry.

10 Claims, 3 Drawing Sheets

INTERFACE CIRCUIT FOR CONTROLLING DATA TRANSFERS

FIELD OF THE INVENTION

The present invention relates to an interface circuit for controlling data transfers, and more particularly to an interface circuit for performing data transfers between a peripheral device such as a hard disk drive (HDD) and a host by via interrupt from the peripheral device to the host.

BACKGROUND OF THE INVENTION

In a personal computer system, an interface, which is called an AT interface, is widely used to connect a host with its peripheral devices. HDD is a typical peripheral device. It is desired from a viewpoint of peripheral manufacturers that communications with a host through the AT interface be standardized, but some commands do allow more than one operation sequence. For example, a Read command for HDD is executed in either one of two operation sequences depending on when a status register of the HDD is read by the host. A first operation sequence is as follows:

1. When data (usually in one sector) becomes ready to be transferred to the host, the HDD sets a data request (DRQ) bit of its status register and at the same time asserts an interrupt request IRQ to the host.

2. Receiving the IRQ from the HDD, the host first reads the status register of the HDD. The IRQ is reset or dropped at that time because the IRQ is always reset whenever the status register is read by the host. The data transfer is then begun.

3. At the completion of the transfer of a sector of data, the HDD resets the DRQ bit.

4. Steps 1 to 3 are repeated until the number of requested sectors is reached.

In the above sequence, the host reads the status register before the data transfer is started, and therefore, this sequence is hereinafter referred to as "pre-read". However, some hosts handle the Read command as follows.

1. Same as Step 1 of the pre-read.

2. Receiving the IRQ from the HDD, the host first starts a data transfer which continues until the end of that sector.

3. Same as Step 3 of the pre-read.

4. The host reads the status register of the HDD (and thus the IRQ is reset).

5. Steps 1 to 4 are repeated until the number of requested sectors is reached.

In the second sequence, the host reads the status register after the transfer of a sector of data is completed, and therefore, this sequence is hereinafter referred to as "post-read". If the host operates in a post-read mode, a malfunction would occur in the case where an attempt to read the status register of the HDD to obtain a current sector status (Step 4 of the post-read) is made by the host after the HDD becomes ready to transfer a next sector of data (Step 1 following Step 4). In this case, an IRQ for the next sector is reset by the status register read for the previous sector transfer, which results in an abnormal situation where the host continues to wait for the IRQ for the next sector while the HDD continues to wait for the data transfer. In fact, such an abnormal situation occurs since the IRQ for the next sector is asserted by hardware as soon as the sector data becomes available.

To avoid the abnormal situation described above, it is necessary to assert the IRQ for the next sector after the host reads the status register. However, since the above abnormal situation will not occur when the host is in the pre-read mode, a scheme to merely delay the IRQ would present a problem in that the performance of data transfer is lowered when the host is in the pre-read mode. Therefore, the prior art has adopted a method in which a switch is set according to whether the host is in the pre-read mode or the post-read mode and, in case of the post-read, the IRQ is asserted again immediately after the status register is read, instead of delaying the IRQ. Thus, the performance is not lowered even in case of the post-read. However, in modern hosts, there are many cases where either one of the pre-read and post-read modes is used depending on an operating system (OS) (E.g., the pre-read and the post-read modes are used under OS/2 and conventional DOS, respectively) and therefore the switch must be set each time of the mode changes.

Another method uses a microcode to entirely control the IRQ. In this method the IRQ is always asserted late which means that both the pre-read and post-read modes function normally. However, the overall performance is not as good as that attainable in a hardware solution.

SUMMARY OF THE INVENTION

It is a principal object of this invention to provide an interface circuit for correctly transferring data with the same hardware even if a host operates in any mode.

It is another object of the present invention to provide an interface circuit which can correctly cope with both pre-read and post-read with the same hardware.

It is yet another object of the present invention to provide an interface circuit including a circuit for automatically determining whether the host is in the pre-read mode or the post-read mode.

It is yet another object of the present invention to provide an interface circuit for delaying an interrupt to a host by a predetermined amount of time only when the host is in the post-read mode.

As described above, the method utilizing a switch for changing the modes causes a problem when both the pre-read and the post-read are available, and the microcode controlled method has a performance problem.

The present invention relates to an interface circuit for correctly performing data transfers irrespective of the mode of a host in a computer system in which data is transferred, based on an interrupt, between a peripheral device and the host. In such a computer system, a peripheral device generates a data request and sends an interrupt request to the host when a block of data is ready to be transferred. The host responds to the interrupt request and then operates either in a first mode to start a block data transfer after reading the status of the peripheral device or in a second mode to read the status of the peripheral device after completing the block data transfer. The interface circuit of the present invention comprises mode detecting means for detecting whether the host operates in the first mode or the second mode, delay means for delaying the data request by a predetermined amount of time when the mode detecting means detects the second mode, and interrupt means responsive to the output of the delay means for sending the interrupt request to the host.

DETAILED DESCRIPTION OF THE INVENTION

Figure 1:
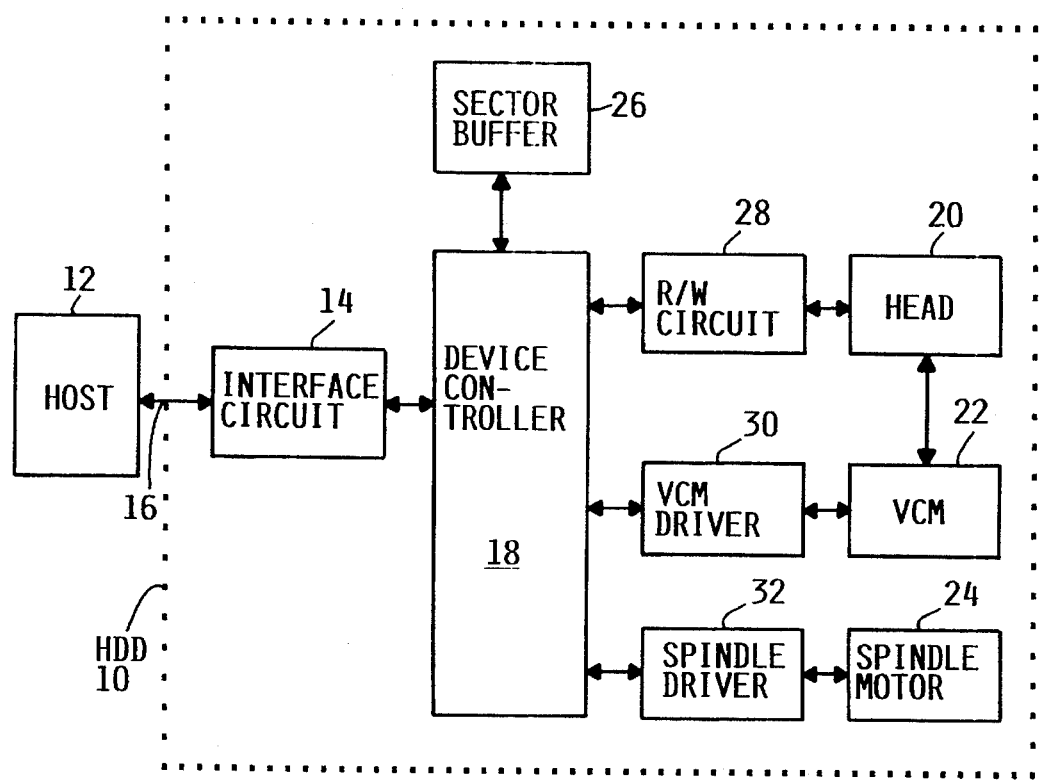
FIG. 1 is a block diagram showing an example of the configuration of a computer system including an interface circuit according to the present invention.

An overall system configuration including the interface circuit of the present invention is shown in FIG. 1. Although a peripheral device is assumed to be a HDD in this embodiment, the present invention can be applied to any peripheral devices having the aforementioned problems with respect to the pre-read and post-read modes.

In FIG. 1, a HDD 10 enclosed by broken lines is connected to a host 12 through an interface circuit 14 and a system bus (AT bus) 16. The host 12 includes a microprocessor such as i80386 or the like and forms a Personal Computer AT system of the present assignee or its compatible system together with the HDD 10 and other peripheral devices (keyboard, display, etc.) not shown.

The HDD 10 includes a microprocessor-controlled device controller 18 which controls the entire HDD. The device controller 18 has three main functions, that is, control of reading and writing by a head 20, control of a voice coil motor (VCM) 22 for moving the head 20, and control of a spindle motor 24 for rotating a disk (not shown). A sector buffer 26 and a read/write (R/W) circuit 28 are used to read or write by the head 20. The sector buffer 26 can store 64 sectors of data (32K bytes) in this embodiment. The R/W circuit 28 has a well-known configuration including various circuits necessary for reading and writing, that is, an amplifier, a peak detector, a variable frequency oscillator (VFO), an encoder, a decoder, a servo logic, an analog-to-digital converter, a digital-to-analog converter, etc. The VCM 22 and the spindle motor 24 are controlled through a VCM driver 30 and a spindle driver 32, respectively. Since, except for the interface circuit 14, each of the system components shown in FIG. 1 may be a conventional one having a well-known configuration, details thereof are not described here.

Figure 2:
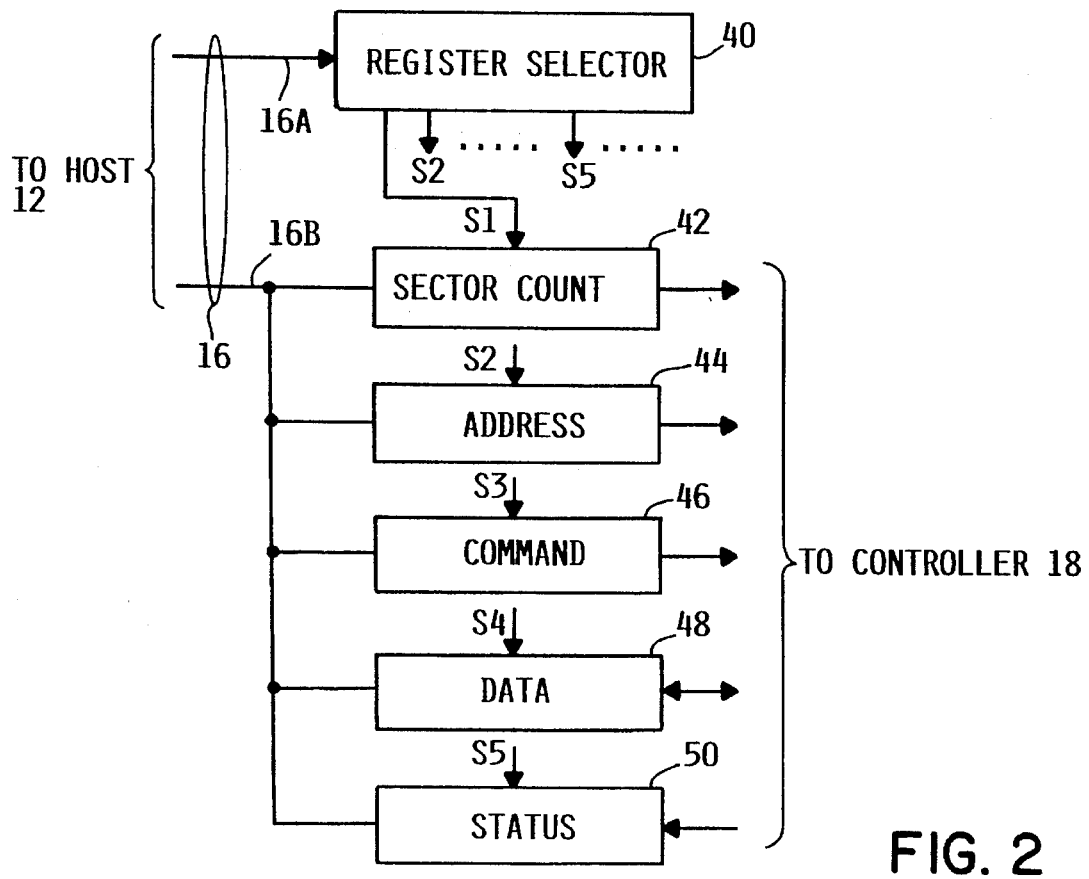
FIG. 2 is a block diagram showing the configuration of an input/output section for the host in the interface circuit.

FIG. 2 shows a configuration of an input/output section of the interface circuit 14. The input/output section includes plural registers selected by a register selector 40, that is, a sector count register 42, an address register 44, a command register 46, a data register 48, and a status register 50. Although the address register 44 actually consists of four registers (two cylinder address registers, one sector address register, and one drive/head address register), these registers are treated, for convenience, as a single register in the following explanation.

The sector count register 42 retains the number of sectors to be read or written, the address register 44 retains a start address thereof, the command register 46 retains a command code, the data register retains data to be written to the HDD 10 from the host 12 or data to be read out to the host 12 from the HDD 10, and the status register 50 contains a plurality of bits indicating status of the HDD (for details, refer to the AT Attachment which is a proposed Standard for the AT interface). These registers are selected by the information provided to the register selector 40 from the host 12 through the system bus 16. At that time, the register selector 40 generates a signal Si (i=1,2,3, . . . ) for selecting a certain register. Although FIG. 2 shows only five registers necessary for the understanding of the present invention, more than five registers are actually provided.

When the host 12 sends a command to the interface circuit 14, it places an address for selecting a certain register and an input/output write (–IOW) signal on a bus 16A and information to be written to the selected register on a bus 16B. The buses 16A and 16B are included in the system bus 16. Taking a Read command as an example, the host 12 first transmits signals for indicating a write to the sector count register 42, that is, an address of the sector count register 42 and an input/output write signal over the bus 16A and a sector count over the bus 16B. The register selector 40 generates a signal S1 for selecting the sector count register 42 in response to the signals on the bus 16A to load the sector count on the bus 16B into the register 42. Then the host 12 transmits signals for indicating a write to the address register 44 and a start address over the buses 16A and 16B, respectively. The register selector 40 thereby generates a signal S2 selecting the address register 44 to load the start address on the bus 16B into the register 44. Finally the host 12 transmits signals for indicating a write to the command register 46 and a Read command code over the buses 16A and 16B, respectively, and the Read command code is thus loaded into the command register 46. Upon completion of loading into the registers 42, 44, and 46, the controller 18 then performs a read operation specified by the contents thereof and writes data read from the disk (not shown) to the sector buffer 26. For a Write command, data to be written to the disk is additionally transmitted over the bus 16B to the data register 48. In the write operation, the aforementioned problem of the pre-read and post-read does not occur, and therefore it is not described here.

Data transfers from the HDD 10 to the host 12 during the read operation are performed on an interrupt basis. As described above, the HDD 10 transmits a data request signal DRQ to the interface circuit 14 when a predetermined number of sectors of data (for example, one sector of data) are written to the sector buffer 26 from the disk and thus data is ready to be transferred to the host. The interface circuit 14 responds to the DRQ and sends an interrupt to the host 12 to start data transfer from the sector buffer 26 to the host 12. An interrupt control section of the interface circuit is shown in FIG. 3 which efficiently performs the data transfer based on the interrupt whether the host 12 is in the pre-read or post-read mode.

Figure 3:
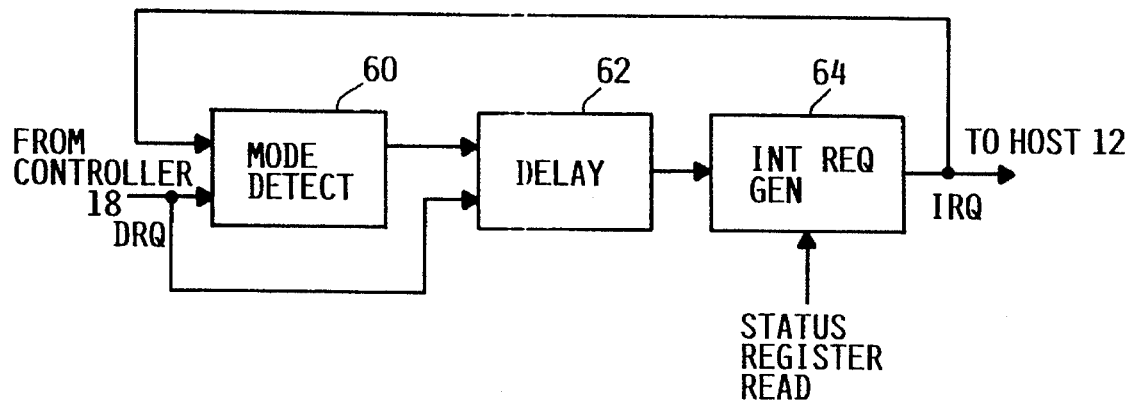
FIG. 3 is a block diagram showing the configuration of an interrupt control section in the interface circuit.

The interrupt control section of FIG. 3 includes a mode detecting circuit 60 for automatically detecting a mode of the host 12 according to the states of a data request signal DRQ from the controller 18 and an interrupt request signal IRQ to be transmitted to the host 12, a delay circuit 62 for delaying the DRQ by a predetermined amount of time when the host 12 is in the post-read mode, and an interrupt request generating circuit 64 for generating the interrupt request signal IRQ in response to an output (hereinafter referred to as controlled DRQ) of delay circuit 62. When the mode detecting circuit 60 detects that the host 12 is in the pre-read mode, the delay circuit 62 does not operate and the DRQ is provided, without delay, to the interrupt request generating circuit 64 as a controlled DRQ.

Figure 4:
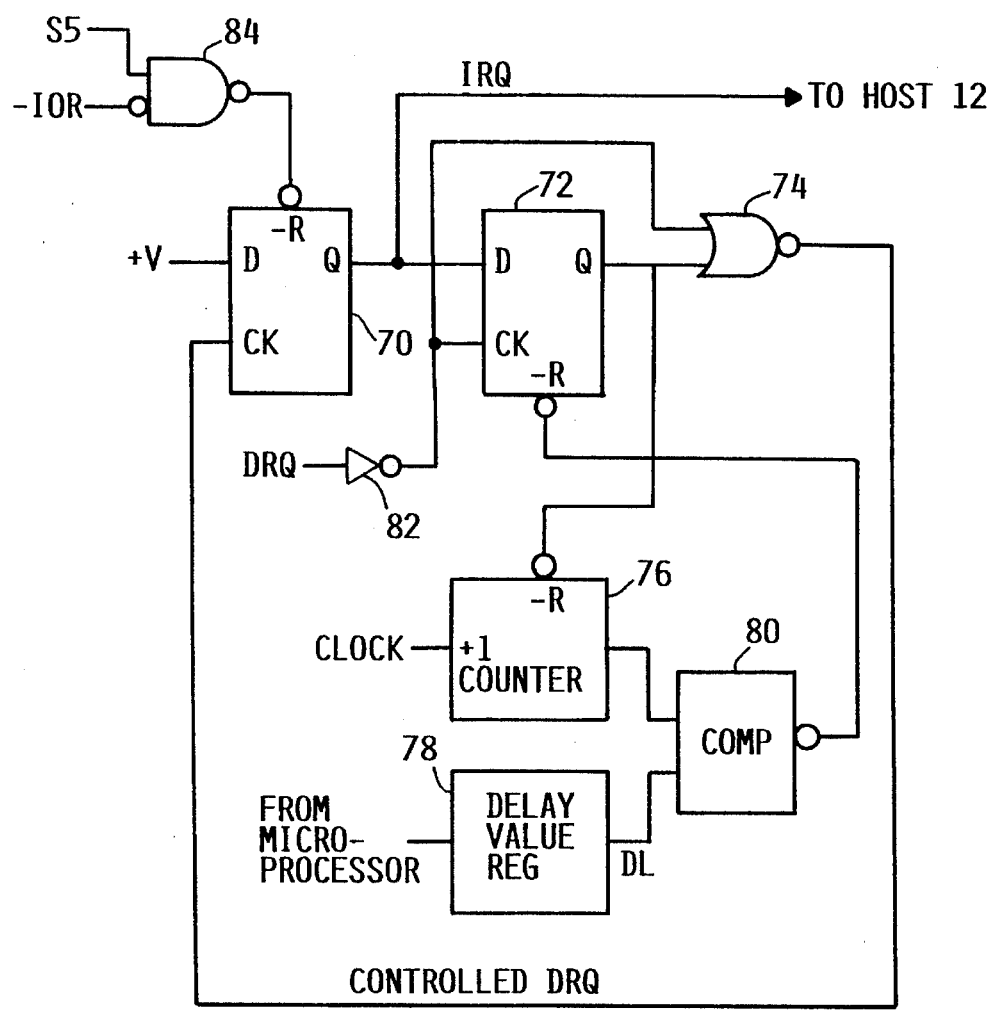
FIG. 4 is a detailed circuit diagram of the interrupt control section shown in FIG. 3.

FIG. 4 shows a detailed circuit diagram of the interrupt control section. The interrupt control section includes a first flip-flop 70 that functions as the interrupt request generating circuit 64 and a second flip-flop 72 that functions as the mode detecting circuit 60. The remainder of the interrupt control section, that is, a NOR gate 74, a counter 76, a delay value register 78, and a comparator 80 compose the delay circuit 62 in FIG. 3. A data terminal D of the first flip-flop 70 is always kept high and its clock terminal CK is connected to an output of the NOR gate 74. The Q output of the first flip-flop 70 is provided not only to a data terminal D of the second flip-flop 72, but also to the host 12. The second flip-flop 72 receives at its clock terminal CK a data request signal DRQ from the controller 18 through an inverter 82. An output of the inverter 82 is provided also to a first input of the NOR gate 74. A Q output of the second flip-flop 72 is connected to a second input of the NOR gate 74 and a negative reset terminal −R of the counter 76. When the counter 76 is released from a reset state by a negative input to the negative reset terminal, starts to count in response to a clock and provides its counted value to a first input of the comparator 80. Provided to a second input of the comparator 80 is a delay value DL retained in the delay value register 78. The delay value register 78 is loaded with a predetermined delay value DL from a microprocessor (not shown) of the controller 18 at each power-on time. The comparator 80 resets the second flip-flop 72 when both inputs become equal to each other. The first flip-flop 70 is reset by an output from a NAND gate 84 when the host 12 indicates that the status register 50 is to be read, that is, the register selector 40 generates a status register select signal S5 and an input/output read signal −IOR is received from the host 12.

Figure 5:
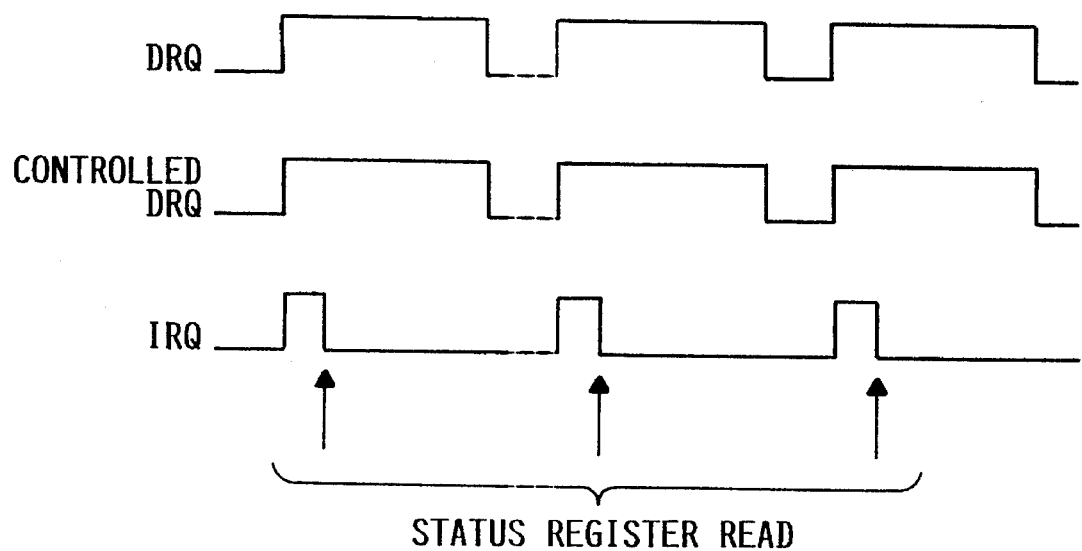
FIG. 5 is a time chart of operations in a case where the host is in the pre-read mode.
Figure 6:
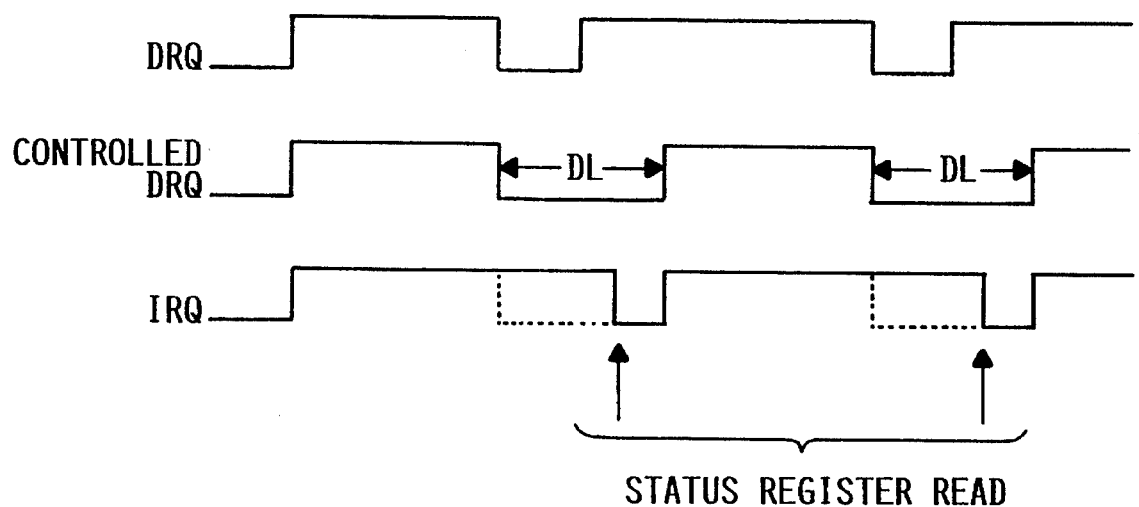
FIG. 6 is a time chart of operations in a case where the host is in the post-read mode.

Next, the operations of the interface circuit according to the present invention are described in detail with reference to FIG. 5 showing a time chart for the pre-read and FIG. 6 showing a time chart for the post-read.

1. Pre-read

As described above, a Read command includes a sector count which specifies the number of sectors to be read, a start address, and a command code. When they are received by the registers 42, 44, and 46 in FIG. 2, respectively, the controller 18 starts to read data from the disk to the sector buffer 26. When a sector of data is written to the sector buffer 26, the controller 18 generates a data request signal DRQ and send it to the interrupt control section (FIG. 3) of the interface circuit 14. The DRQ is inverted by the inverter 82 and then provided to the clock terminal CK of the flip-flop 72 and the first input of the NOR gate 74. Since the second input of the NOR gate 74, that is, the Q output of the flip-flop 72 is kept low, the output of the NOR gate 74 becomes high and is applied to the clock terminal CK of the first flip-flop 70 as a controlled DRQ signal. Since the data terminal D of the first flip-flop 70 is always high, the flip-flop 70 is set by the application of the controlled DRQ so that its Q output, that is, an interrupt request IRQ becomes high to interrupt the host 12. Although the IRQ is applied also to the data terminal D of the flip-flop 72, the flip-flop 72 remains reset since the clock terminal CK of the flip-flop 72 is kept low at that time.

The host 12 in the pre-read mode reads the status register 50 in the interface circuit 14 in response to the interrupt request IRQ from the HDD 10 to know the status of the HDD 10 before starting data transfer.

To this end, the host 12 transmits signals indicating read of the status register 50, that is, an address of the status register 50 and an input/output read signal −IOR over the bus 16A. In response to the signals, the register selector 40 generates a signal S5 for selecting the status register 50 to cause its contents to be gated to the bus 16B. The status register 50 contains not only the DRQ bit described above but also a plurality of status bits representing the status of the HDD 10 such as a busy bit indicating that the HDD 10 is busy, an error bit indicating that an error has occurred during the command execution, etc.

The status register selecting signal S5 is applied also to a first input of the NAND gate 84. Applied to a second input of the NAND gate 84 is an input/output read signal −IOR from the host 12. This signal indicates reading of various I/O registers (refer to FIG. 2) in the interface circuit 14 and is defined, in the AT interface, as active low. The NAND gate 84 is conditioned by the active S5 and −IOR to reset the flip-flop 70. Thus the interrupt request IRQ to the host 12 is dropped (refer to a waveform of the IRQ shown in FIG. 5).

To read data written to the sector buffer 26, the host 12 transmits a signal for reading the data register 48 over the bus 16A, following the status register 50 read. Assuming that a bit width of the data register 48 is 16 bits and one sector is 512 bytes, then the host 12 must read the data register 48 256 times for each sector. The data register 48 may be either a latch type or a gate type. If the data register 48 is a latch type, the controller 18 generates a data request signal DRQ after loading the first 16 bit-word from the sector buffer 26 into the data register 48 and, thereafter, sequentially reads a 16 bit-word from the sector buffer 26 and loads it into the data register 48 each time the host 12 reads the data register 48. If the data register is a gate type, the controller 18 generates a DRQ immediately after a sector of data is written into the sector buffer 26 and, thereafter, sequentially reads a 16 bit-word from the sector buffer 26 and gates it to the bus 16B each time the host 12 directs a read of the data register 48. In either case, the controller 18 counts read signals −IOR from the host 12 and drops the DRQ when the count reaches 256.

When the DRQ becomes low, the output of the inverter 82 becomes high and therefore the output of the NOR gate 74, that is, the controlled DRQ will become low. Thereafter, when the next sector of data is ready to be transferred, the controller 18 sets the DRQ high again and repeats the above operation. Thus, in the pre-read mode, the DRQ and the controlled DRQ have the same timing so far as delay in the inverter 82 and the NOR circuit 74 is neglected. If the next sector data is read from the disk and written to the sector buffer 26 after the host 12 reads the first sector data, it would take a longer time to complete the Read command. Therefore, it is preferable that a read from the sector buffer 26 to the host 12 and a write from the disk to the sector buffer 26 are performed in parallel. In this case, data from the disk is written to the sector buffer 26 while data read from the sector buffer 26 is transferred to the host 12, that is, a read operation for the sector buffer 26 is not performed. The same is true of the post-read mode described below. When the number of sector data transferred to the host 12 reaches the sector count loaded into the sector count register 42, the execution of the Read command is completed.

2. Post-read

Operations in the case where the host 12 is in the post-read mode are the same as in the pre-read mode until an interrupt request IRQ is generated. In the post-read mode, the host 12 starts data transfer from the sector buffer 26 to the host 12 by first directing a read of the data register 48 in response to the interrupt request IRQ. After reading a sector of data, the host 12 directs a read of the status register 50. In the interface circuit 14, likewise the pre-read, a DRQ becomes low when the host 12 has reads 512 bytes of sector data, which is followed by a controlled DRQ becoming low. However, as shown in FIG. 6, at the time when the DRQ and the controlled DRQ become low, the status register 50 is not read yet so that the flip-flop 70 is not reset and the interrupt request IRQ remains high. Therefore, the flip-flop 72 is set when the DRQ becomes low which enables the clock terminal CK of the flip-flop 72 through the inverter 82. The flip-flop 72 is set only in this case, that is, only when the DRQ is low and the IRQ is high. This means that the host 12 is in the post-read mode. It is seen, therefore, that the flip-flop 72 serves as a mode detecting circuit. Since the NOR gate 74 receives the Q output of the flip-flop 72, its output or controlled DRQ remains low as far as the flip-flop 72 is set.

Also, the high Q output releases the counter 76 from the reset state. The counter 76 remains reset as far as the flip-flop 72 is reset and the negative reset terminal −R is kept low. When the counter 76 is released from the reset state, it starts to count and increments by one each time a clock pulse is applied. The contents of the counter 76 are provided to the comparator 80 to compare with the contents of the delay value register 78. The delay value register 78 retains a predetermined delay value DL loaded from a microprocessor (not shown) of the controller 18 during the power-on operation. The delay value DL is programmable and previously set, in consideration of the timing of resetting the IRQ by the status register read from the host 12, so that the controlled DRQ rises later than the reset timing (refer to FIG. 6). When a count value of the counter 76 becomes equal to the contents of the delay value register 78, the output of the comparator 80 becomes low to thereby reset the flip-flop 72. Even if the next sector data is ready to be transferred and the controller 18 sets the DRQ high again before the flip-flop 72 is reset, the controlled DRQ, which is an output of the NOR gate 74, remains low until the flip-flop 72 is reset. If the status register 50 is read before the flip-flop 72 is reset, the flip-flop 70 is reset by the output of the NAND gate If the DRQ is at a high level again when the flip-flop 72 is reset, the NOR gate 74 is conditioned to make its output high. Consequently, the flip-flop 70 is set again and thereby an interrupt request IRQ is asserted to the host 12 again. Thus, according to the present invention, even if an IRQ is not yet reset when a DRQ rises in a second or subsequent sector data transfer, an IRQ for the next sector data transfer can be surely generated. When a specified number of sector data are read by the host 12, the execution of a Read command is completed.

Although the preferred embodiments have been described, the present invention is not limited thereto and allows various modifications. For example, in the embodiments, the DRQ and IRQ were controlled based on a sector of 512 bytes as a unit block. However, it is appreciated that the length of the unit block is not limited to 512 bytes and may be determined arbitrarily within a suitable range. Further, in the post-read mode, the IRQ may be reset immediately after the DRQ becomes low with the exception of the time when the last sector data is read, which IRQ was reset by the status register read. Dotted lines in FIG. 6 show this modification, which may be implemented by adding a circuit for resetting the flip-flop 70 on condition that the DRQ becomes low and the last sector data is not read yet.

According to the present invention, by automatically detecting whether a host operates in the pre-read mode or the post-read mode, any host can be surely served with the same hardware.

Although a specific embodiment has been disclosed, it will be understood by those skilled in the art that additional variations in form and detail may be made within the scope of the following claims.

What is claimed is:

1. In a computer system in which a peripheral device generates a first data request and a first associated interrupt request to a host when a block of data is ready to be transferred, and said host responds to said associated interrupt request and operates either in a first mode to start a block data transfer after reading status of said peripheral device or in a second mode to read said status after completing said block data transfer, an interface circuit for controlling data transfers comprising:

mode detecting means for detecting whether said host operates in said first mode or in said second mode;

delay means for delaying a second data request and a second associated interrupt request by a predetermined amount of time when said mode detecting means detects said second mode, said delay means generating an output; and interrupt means responsive to said output of said delay means for sending said second associated interrupt request to said host.

2. The interface circuit of claim 1 wherein said first associated interrupt request and said second associated interrupt request are reset by the reading of said status.

3. The interface circuit of claim 2, wherein said first data request is reset at the completion of reading said block of data and said second data request is generated when a next block of data is ready to be transferred.

4. The interface circuit of claim 3, wherein said mode detecting means detects a mode of said host in response to said data request and said first associated interrupt request.

5. The interface circuit of claim 4, wherein said mode detecting means includes a flip-flop to be set on condition that said data request is reset and said first associated interrupt request is not reset.

6. The interface circuit of claim 5, wherein said delay means comprises a counter which starts to count in response to said flip-flop set, a register into which a predetermined delay value is loaded, a comparator which compares said counter and said register and resets said flip-flop when they are equal to the contents of each other, and a gate circuit which generates a delayed data request in response to said flip-flip reset.

7. The interface circuit of claim 6, wherein said gate circuit is a NOR gate which receives an output of said flip-flop and an inverted data request.

8. The interface circuit of claim 7, wherein said delay means includes a second flip-flop to be set when an output of said gate circuit is enabled.

9. The interface circuit of claim 6, wherein said delay means includes a second flip-flop to be set when an output of said gate circuit is enabled.

10. The interface circuit of claim 9, wherein said second flip-flop is reset by the reading of said status.

* * * * *